May 16, 1939.  J. BAUMANN  2,158,847

ELASTIC COUPLING

Filed Feb. 19, 1937  2 Sheets-Sheet 1

INVENTOR
JOHANNES BAUMANN by C. A. Goepel
ATTORNEY

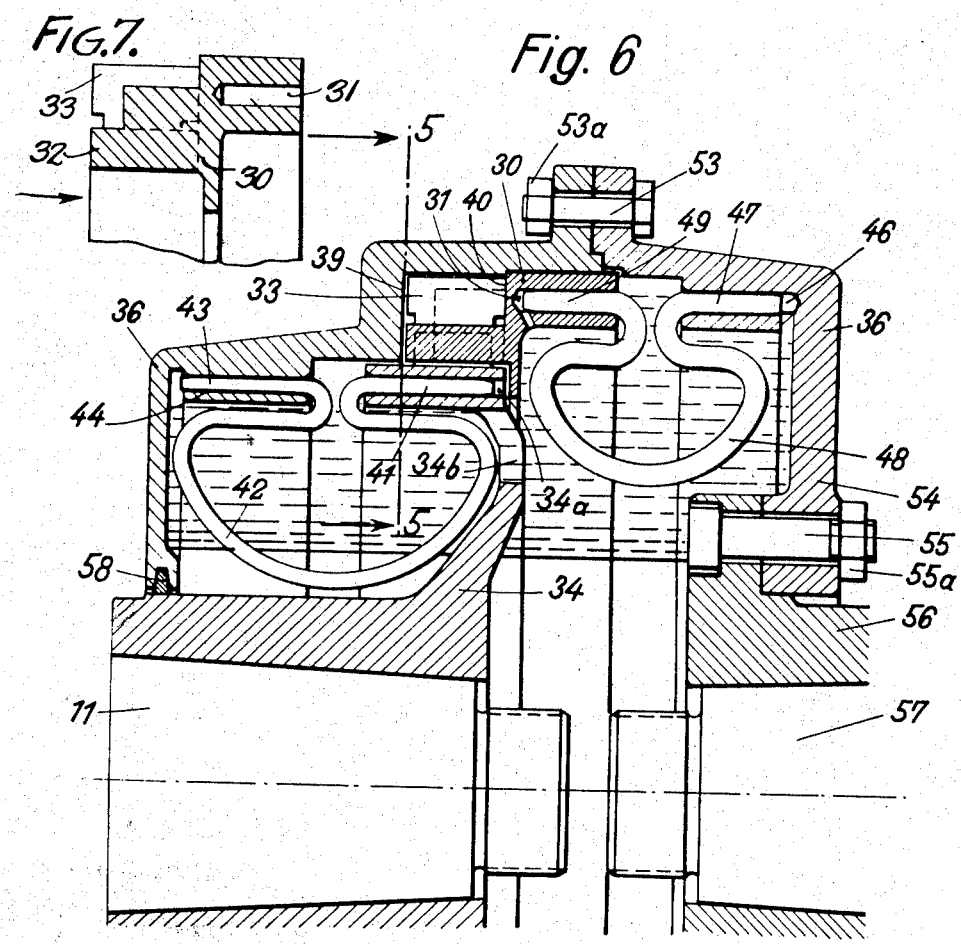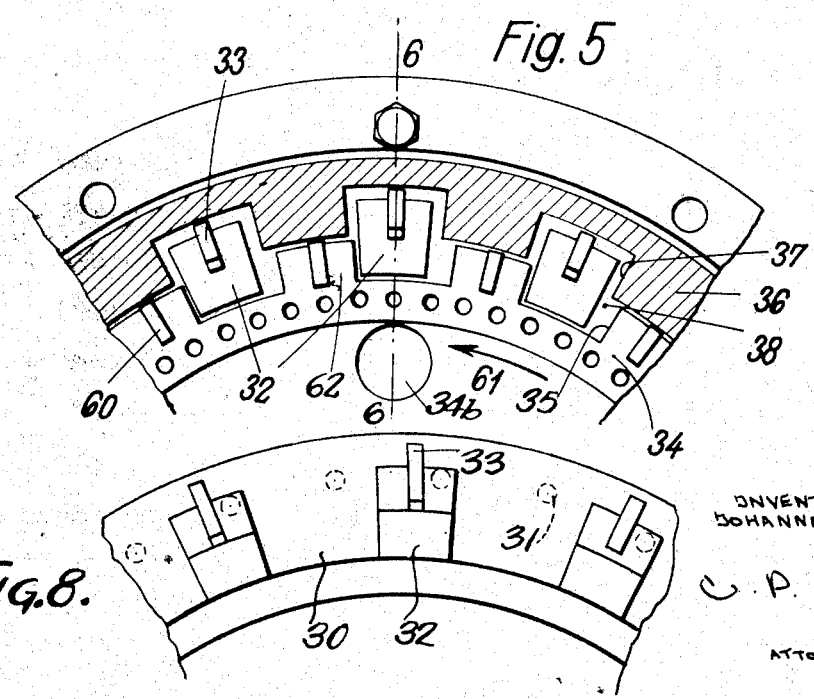

Patented May 16, 1939

2,158,847

UNITED STATES PATENT OFFICE 2,158,847

ELASTIC COUPLING

Johannes Baumann, Heidenheim-on-the-Brenz, Germany, assignor to J. M. Voith, Heidenheim-on-the-Brenz, Germany, and St. Poelten, Austria, a copartnership composed of Walther Voith, St. Poelten, Austria, and Hermann Voith and Hanns Voith, Heidenheim-on-the-Brenz, Germany Application February 19, 1937, Serial No. 126,692
In Germany February 20, 1936

11 Claims.  (Cl. 64—15)

This invention relates to elastic couplings and more particularly to that type in which the coupling members are joined by intervening spring members, such as shown in United States Letters Patent No. 2,042,069, dated May 26, 1936.

In couplings of this general class, it has been found that in cases of excessive load or sudden shock-like demands thereupon, danger existed in respect to breaking of parts of the coupling.

To overcome these objections, the object of the invention is to provide means whereby such an overloading or such shock-like strains may be absorbed in such a manner that the parts of the coupling are not injured, by virtue of a progressive taking up of the load.

The invention consists in providing means for absorbing such shocks and various loads, and one embodiment includes a series of chambers filled with oil or grease in one of the coupling members, into which chambers, teeth-like projections arranged on the other coupling enter, so arranged that the shock-like movement to which one coupling member may be subjected, will necessitate the movement of the teeth against the resistance of the oil or grease, until the teeth abut against the walls forming the chambers, which gives a further resistance to the relative movement of the coupling members, and thus prevents damage to the springs by the shock action.

To make the coupling responsive to varied loads, the invention consists further in providing a series of pluralities of springs between the coupling members, arranged to correspond to the entire load to which the elastic coupling is intended to be subjected, one plurality of springs taking up the lighter loads and another plurality of springs taking up the heavier loads, the springs having such elastic spring characteristics that the heavier loads are taken up by the heavier springs, after the lighter loads have been absorbed by the lighter springs.

Finally, the invention consists in the combination of such a series of pluralities of springs with the fluid shock absorbing chambers and teeth, in which, in one embodiment, a floating ring provided with teeth-like projections is connected to two sets of springs, such floating ring teeth entering into grease filled chambers in both coupling members to which the other ends of the springs are connected, whereby upon one shock-like strain being applied, the floating ring teeth cooperate with the chambers of the member of the coupling having one set of springs, and upon a greater shock-like strain the teeth cooperate with the chambers of the other member of the coupling having the other or stronger springs. In each case wherein the grease or oil is used, the parts are so arranged as to act as throttling members to the free flow of the oil or grease, so as to provide a suitable resistance to the moving parts subjected to the shock.

One of the advantages of the invention is that an elastic coupling of this type may be subjected to strains greater than the calculated elasticity of the springs, without injuring the coupling or parts thereof.

As the usual couplings have only one set of springs disposed between the two members of the coupling, these springs are calculated to resist the highest normal demands thereon. Such couplers, in consequence, are not as elastic as they should be for the lower loads and did not meet such demands or did so only in a partially satisfactory manner. The embodiment of this invention having two or more sets of springs, complies with this requirement in that the sets of springs are made to correspond to different load demands. Thereby, during the lower loads only certain of the sets of springs come into operation, and during higher loads additional sets come into operation. A floating ring forming with the coupling members shock absorbing means, is disposed between the two sets of springs, whereby sudden shocks are fully or partially dampened out or absorbed.

The foregoing invention comprises then, means disposed between the coupling members to absorb the various loads to which the coupling is subjected, wherein the spring connecting members are protected from excessive shocks on the one hand, and are permitted on the other hand, to respond to parts of the entire load to which the coupling is intended to be subjected.

In the accompanying drawings:

Figure 5 is a partial side view of the two coupling members showing still another embodiment of this invention as seen on line 5—5 of Fig. 6 in the direction of the arrows;

Figure 6 is a section taken on line 6—6 of Fig. 5;

Figure 7 shows a section of the floating ring forming part of the embodiment of Fig. 6; and Figure 8 is a partial side view of the ring shown in Fig. 7, as seen in the direction of the arrow in Fig. 7.

Similar characters of reference indicate corresponding parts throughout the various views.

Figure 1:
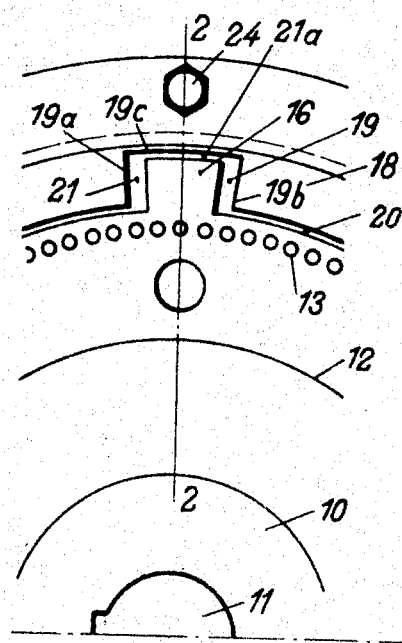
Figure 1 is a partial side view of two coupling members showing one embodiment of this invention.
Figure 2:
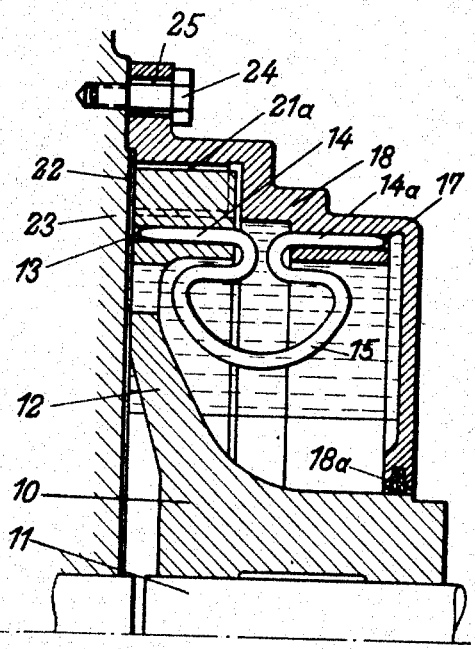
Figure 2 is a section taken on line 2—2 of Fig. 1.

Referring to the drawings and more particularly to Figures 1 and 2, the coupling as is well known, consists of two members one of which, indicated by reference character 10, is secured to the shaft 11 and has a radially outwardly extending portion 12 provided with circumferentially disposed and spaced recesses or holes 13 for the reception of legs 14 of the coupling springs 15. The coupling member 10 is provided along its circumferential portion with a plurality of tooth-like members 16, as shown in Figure 1, and said members 16 are suitably spaced apart. In Fig. 1, only one of these tooth-like members is shown as one or a plurality thereof may be utilized. In Fig. 1, the position shown of the members 16 corresponds to the normal full load of the coupling. The other coupling member 18 is provided with a sealing member 18a which rests upon the coupling member 10 and at its peripheral portion is provided with a series of cut-outs forming chambers. These cut-outs are deeper than the length of the projections 16 and are also longer than the width of the projections 16 so as to provide a spatial portion between the tooth-like projection 16 and the chamber 19. In addition, in this embodiment, there is provided a restricting space between the two coupling members 12 and 18, as shown in Fig. 1, indicated by reference character 20, which is relatively small so as to act as a constriction for the flow of any fluid therebetween. Likewise, the space between the outermost portion of the tooth-like projection 16 and corresponding wall of the chamber 19 provides a narrow space 21ª which also acts as a restricted area to the flow of any fluid therebetween. The space between the walls of the chamber 19 and the walls of the tooth-like projection 16 is filled with lubricating grease or oil of suitable consistency which, due to the constricted portion 20 between the coupling members, is largely maintained within the chamber, when the coupling is under normal operation. The chamber is closed at one end portion by a suitable shoulder portion 21 in the wall forming the coupling member 18, and the other end portion of the chamber is closed by the wall 22 of the driven member 23. The driven member 23 is secured to the coupling member 18 by means of bolts 24 engaging the driven member 23 through an opening 25 in coupling member 18. Thus the side walls 19a, 19b and top wall 19c together with shoulder 21 and the wall 22 of the driven member 23, form an enclosed space which is filled with grease or oil in which space the tooth-like projections 16 are capable of moving against the resistant action of the grease or oil.

The coupling member 18 is also provided with circumferentially arranged and spaced holes or recesses 17 for the entrance of the other leg members 14a of the springs 15, in a manner well known.

Figure 3:
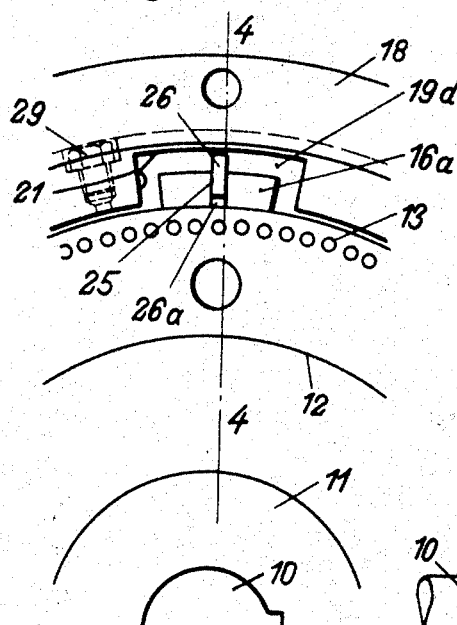
Figure 3 is a partial side view of the two coupling mmebers showing another embodiment of the invention.
Figure 4:
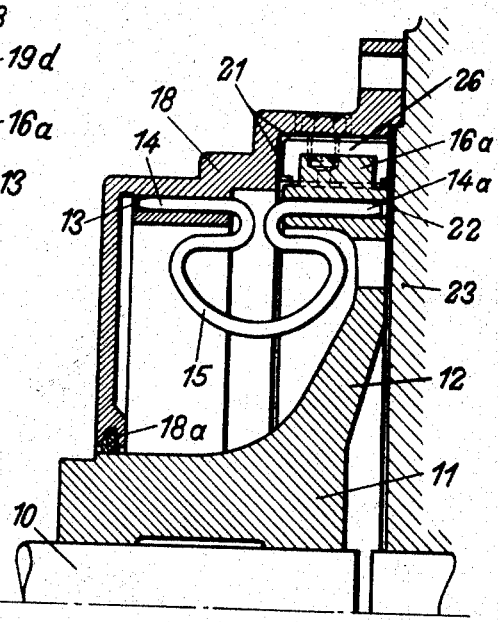
Figure 4 is a section taken on line 4—4 of Fig. 3.

In Figures 3 and 4, the coupling 12 is again provided with a tooth-like projection 16a entering the chamber 19d formed by cut-outs in the walls of coupling 18, but in this case the tooth-like projection 16a is provided with a slotted portion 25 acting as a guide for a piston-like member 26. The piston member 26 may be pushed outwardly by springs 26a or the like in any well-known manner, or may be actuated only by centrifugal force due to the rotation of the coupling members. A suitable oil or grease filling valve 29 is shown in Figure 3 which on the removal of its cap is adapted to be used to fill the chambers between the coupling members and also to supply any losses which have to be compensated for. After the filling has been accomplished the cap of this filling member 29 is replaced.

In the embodiment shown in Figure 4, the ends of the chambers 19d are formed by parts 21 of the wall of coupling member 18 and wall 22 of the driven member 23.

Referring to Figs. 5 and 6, the underlying concept of having tooth-like members entering into chambers formed by one or the other coupling members, is shown, but in this case the tooth-like projections form part of a floating ring which is disposed between two sets of springs. There are a plurality of these springs circumferentially arranged around and between the coupling members, and in Figure 6 only one spring of each set is shown. In the embodiment shown in Fig. 5, the floating ring 30 has a plurality of slots or recesses 31 for the entrance of one leg of one set of springs and the ring is provided on the other side thereof with a plurality of laterally projecting spaced apart tooth-like members or projections 32. These may or may not have a sliding piston member such as shown by the numeral 33 which here is subjected to centrifugal action. The coupling members in this embodiment, as shown in Figs. 5 and 6, are so arranged that each coupling member has a cut-out portion, one member along its outer periphery and the other coupling member on its interior bore portion and the cut-outs are arranged in complementary fashion, that is, one coupling member 34 has cut-outs 35 while the other coupling member 36 has cut-outs 37. These cut-outs have substantially the same width so that the two cut-outs 35 and 37 when registering with each other form a chamber 38 therebetween. In this chamber 38 one of the projections 32 of the floating ring 30 projects. While these cut-outs of both couplings form the side walls and top and bottom walls of the chamber 38, the end walls are formed on the one hand by the shoulder 39 of coupling member 36 and the other end of the chamber is substantially closed by the wall 40 of the floating ring 30. After the floating ring projections 32, enter chambers 38, the space therebetween and between the coupling members, is filled with oil or grease, in the same manner as heretofore described.

Referring more particularly to Figure 6, the shaft 11 has a coupling member 34 which has its radially extended portion provided with recesses or slots 34a for the inwardly extending leg 41 of the coupling spring 42, the other leg 43 of the spring 42 entering into slot 44 of the coupling member 36. The member 34 has an opening 34b to allow exchange of grease or oil and air from one part of the interior of the coupling to the other. The coupling member 36 is provided with a slot 44 for the leg 43 of the spring 42, and the coupling member 36 has an additional hole 46 for the leg 47 of the spring 48. The other leg 49 of the spring 48 enters a hole 31 of the floating ring 30. It is of course understood that a plurality of these springs are circumferentially arranged around the coupling members and suitably held for rotary movability in the coupling members.

The coupling member 36 in the embodiment shown in Fig. 6, is made of two parts for convenience of manufacture, and these parts are suitably bolted by bolts 53 and nuts 53a, and the depending portion 54 of the coupling member 36 is suitably bolted by bolts 55 and nuts 55a to the driven member 56 which is secured to the driven shaft 57. As in the other embodiments, the coupling member 36 is also furnished with a sealing member 58 disposed between the coupling member 36 and coupling member 34.

In Fig. 5, the coupling member 34 is also provided with sliding pistons 60 which by centrifugal action and if necessary by additional spring action, press outwardly against the bore of the coupling member 36.

In Figures 7 and 8, detail views of the floating ring 30, are shown.

In Figure 5, the parts there shown correspond to the position of the coupling members when they are under no load. If the coupling member 34 rotates in the direction of the arrow 61, and the coupling is put under load, the teeth 62 of the member 34 move relative to member 36 in the direction of the arrow 61 until they abut against teeth 32 of the floating ring 30. Up to this position, torque is transmitted only through springs 42. If the load is further increased, the heavy springs 48, through the medium of the floating ring 30, participate in the transmission of the torque until teeth 32 of floating ring 30 which rotates in accordance with the yielding movement of the heavy springs, abut against the wall of the chambers 38 in the coupling member 36. From the fact that chambers 38 are filled with a lubricant fluid enclosed by restricting parts, it is clear that the relative motion of the teeth 62 of coupling 34, as well as that of floating ring 30, requires a displacement of lubricating fluid through the restricted spaces, which if sudden motions of the said parts occur due to sudden load changes and shocks in the load demand, provide a shock absorbing effect protecting the springs from being overstrained.

The invention comprises also the use of a plurality of elastic spring members of different characteristics, whereby the sphere of usefulness of elastic couplings is increased. In contrast to a single plurality of such springs which are usually calculated for the maximum load of the coupling, and which when used with lower loads are not sufficiently elastic, and thereby or in part, the invention hereinabove described, comprises a plurality of sets of springs, each set in this case having different spring characteristics. Thereby, the coupling is made sufficiently elastic throughout the range of loads to which such coupling is subjected, each group of connecting members being of such elastic characteristics as to correspond best to the load it is intended to assume. Thus, as described, by a suitable selection of spring connecting members, only those members corresponding to their load are switched in or set in operation, whereas with higher or the highest loads the additional set of plurality of connecting members is switched in, and these first after the limit of the first group has been reached, or at a time just prior thereto. By the transformation of excessive shock energy to the form changing work and friction, the relatively delicate spring connecting members are protected against objectionable strains.

The action of the viscous medium or fluid or grease is elastic in that it is enabled to flow as described, so that from one extreme to the other of the load the yielding fluid action and the elastic spring action cooperate to have one coupling member rotate the other.

It will have been noted that the invention in part comprises an elastic all metal coupling which enables the demands made upon such a coupling, due to the energy created by very strong shocks, to be met, the shock energy being either transformed or destroyed or reduced to a minimum. It overcomes the disadvantages of couplings of this character, and enables elastic all metal couplings to absorb larger shocks, far above those corresponding to the calculated elasticity, and avoids the breakage of the elastic transmission parts of the couplings or the machine parts thereof. This is particularly important when the coupling is connected with masses of large flywheel effects. The energy generated by the shocks is during the angular rotation of the coupling members partially or entirely consumed in addition to such as is consumed by the elastic spring resistance, and thereby the excessive demands otherwise made upon these sensitive elastic coupling parts is avoided, or at least decreased to an extent as to be harmless. The work produced by the change of form of the plastic medium such as grease, and the friction enables this to be achieved in connection with the cut-outs or chambers in one coupling and the entering tooth-like projections of the other coupling, with the resisting grease in constricted flow channels therebetween, which is then transposed and pressed through a neighboring space of narrower cross section. By this pressing of the grease through the narrower or constricted portions, form changing work is done, and on the other hand energy is absorbed by friction.

The coupling members described are usually in the form of rotating discs facing each other, and have therebetween either one set of a plurality of spring connecting members or a plurality of such sets, which spring connecting members transmit the action of rotation of one coupling disc to the other.

The means added to the known elastic coupling are adapted to absorb all the effects of variations in the load to which the coupling is intended to be subjected, in such a way that the strain on the said elastic means is safely limited to a predetermined maximum.

From the foregoing description, it will be seen that my invention may be employed in various forms and devices, and it is clear that changes may be made therein without departing from the spirit of the invention as defined in the attached claims.

I claim:

1. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means consisting of all metal C springs having one end engaging one coupling member and the other end engaging another coupling member, straddling two adjoining coupling members and being stressed substantially torsionally only, when under load, and means, independent of the springs, operative at the overload and beyond the maximum load of said springs, to mechanically join the coupling members and prevent the action of an overload upon said springs by effecting direct transmission of the overload directly from one coupling member to the other.

2. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means consisting of all metal C springs having one end engaging one coupling member and the other end engaging another coupling member, straddling two adjoining coupling members and being stressed substantially torsionally only, when under load, means, independent of the springs, operative at the overload and beyond the maximum load of said springs, to mechanically join the coupling members and prevent the action of an overload upon said springs by effecting direct transmission of the overload directly from one coupling member to the other, said last named means comprising cutouts forming chambers in one coupling member, and projections for said chambers on the other coupling member.

3. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means consisting of all metal C springs having ends engaging the coupling members, means, operative at the overload and beyond the maximum load of said springs, to mechanically join the coupling members and prevent the action of an overload upon said springs by effecting direct transmission of the overload directly from one coupling member to the other, said last named means comprising cutouts forming chambers in one coupling member, projections for said chambers on the other coupling member, a viscous medium in said chambers, and a constricted flow means for said medium, for the absorption of shocks by means of form changing work and friction of the viscous medium.

4. An elastic coupling, comprising coupling members adapted to rotatably change their positions in respect to each other, resilient means therebetween for transmitting rotary movement of one coupling member to the other coupling member, within the maximum load to which said resilient means is intended to be subjected, said resilient means consisting of all metal C springs having ends engaging the coupling members, means, operative at the overload and beyond the maximum load of said springs, to mechanically join the coupling members and prevent the action of an overload upon said springs by effecting direct transmission of the overload directly from one coupling member to the other, said last named means comprising cutouts forming chambers in one coupling member, projections for said chambers on the other coupling member, a viscous medium in said chamber, a constricted flow means for said medium, for the absorption of shocks by means of form changing work and friction of the viscous medium, and piston means disposed between the projection and wall of the cutout for closing the gap therebetween.

5. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means consisting of all metal C springs having ends engaging the coupling members, means, operative at the overload and beyond the maximum load of said springs, to mechanically join the coupling members and prevent the action of an overload upon said springs by effecting direct transmission of the overload directly from one coupling member to the other, said last named means comprising cutouts forming chambers in one coupling member, projections for said chambers on the other coupling member, a viscous medium in said chamber, a constricted flow means for said medium, for the absorption of shocks by means of form changing work and friction of the viscous medium, piston means disposed between the projection and wall of the cutout for closing the gap therebetween, and a spring for moving the piston of the piston means.

6. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means including a plurality of sets of all metal C springs having ends engaging the coupling members, one of the ends of one set of springs being free from connection with the coupling members, and a ring connected with the free ends of the last named set of springs and having projections, each of said coupling members having cutouts forming chambers adapted to be engaged by said projections.

7. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means including a plurality of sets of all metal C springs having ends engaging the coupling members, one of the ends of one set of springs being free from connection with the coupling members, a ring connected with the free ends of the last named set of springs and having projections, each of said coupling members having cutouts forming chambers adapted to be engaged by said projections, a viscous medium in the chambers, and a constructed flow means for said medium for the absorption of shocks by means of form changing work and friction of the viscous medium.

8. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means including a plurality of sets of all metal C springs having ends engaging the coupling members, one of the ends of one set of springs being free from connection with the coupling members, a ring connected with the free ends of the last named set of springs and having projections, each of said coupling members having cutouts forming chambers adapted to be engaged by said projections, a viscous medium in the chambers, a constricted flow means for said medium for the absorption of shocks by means of form changing work and friction of the viscous medium, and piston means disposed between the projections and walls of the chambers for closing the gap therebetween.

9. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means including a plurality of sets of all metal C springs having ends engaging the coupling members, one of the ends of one set of springs being free from connection with the coupling members, a ring connected with the free ends of the last named set of springs and having projections, each of said coupling members having cutouts forming chambers adapted to be engaged by said projections, a viscous medium in the chambers, a constricted flow means for said medium for the absorption of shocks by means of form changing work and friction of the viscous medium, piston means disposed between the projections and walls of the chambers for closing the gap therebetween, and a spring for moving the piston of said piston means.

10. An elastic coupling, comprising coupling members adapted to rotatably change their positions in respect to each other, resilient means therebetween for transmitting rotary movement of one coupling member to the other coupling member within the maximum load to which said resilient means is intended to be subjected, said resilient means including a plurality of sets of all metal C springs having ends engaging the coupling members, one of the ends of one set of springs being free from connection with the coupling members, and a ring connected with the free ends of the last named set of springs and having projections, each of said coupling members having cutouts forming chambers adapted to be engaged by said projections, one set of springs being adapted for the lighter loads, the other set of springs being adapted for the heavier loads, said projections of the ring engaging only the walls of the chambers of one coupling member during the lighter loads and the walls of the chamber of both of the coupling members during heavier loads.

11. An elastic coupling, comprising coupling members adapted to rotatably change their positions in respect to each other, resilient means therebetween for transmitting rotary movement of one coupling member to the other coupling means is intended to be subjected, said resilient means including a plurality of sets of all metal C springs having ends engaging the coupling members, one of the ends of one set of springs being free from connection with the coupling members, and a ring connected with the free ends of the last named set of springs and having projections, each of said coupling members having cutouts forming chambers adapted to be engaged by said projections, one set of springs being adapted for the lighter loads, the other set of springs being adapted for the heavier loads, said projections of the ring engaging only the walls of the chambers of one coupling member during the lighter loads and the walls of the chambers of both of the coupling members during heavier loads, the higher loads being taken up by the higher load set before the load limit of the lighter load set is reached.

JOHANNES BAUMANN.